Feb. 8, 1966 W. GERHARDT 3,233,870
ROADSIDE GUARD STRUCTURE
Filed May 17, 1961 3 Sheets-Sheet 1
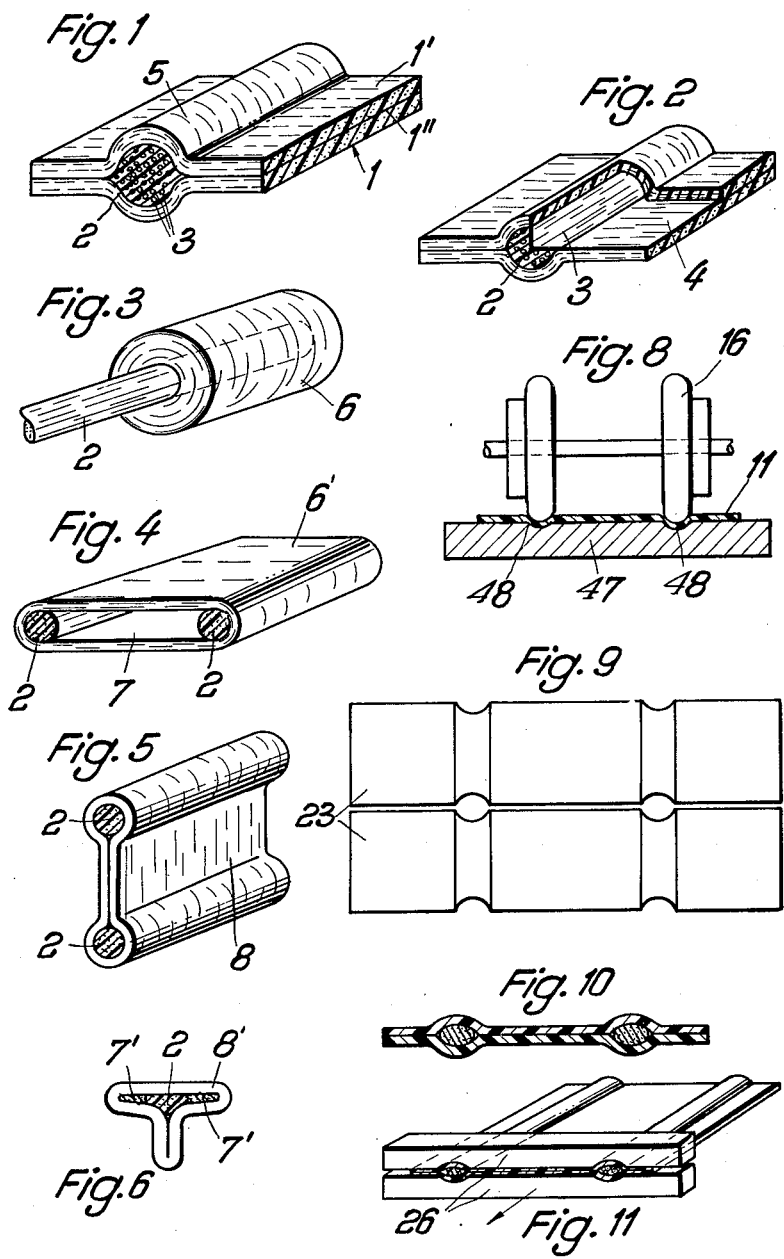
Inventor:
Woldemar Gerhardt
by Western, Ross & Western

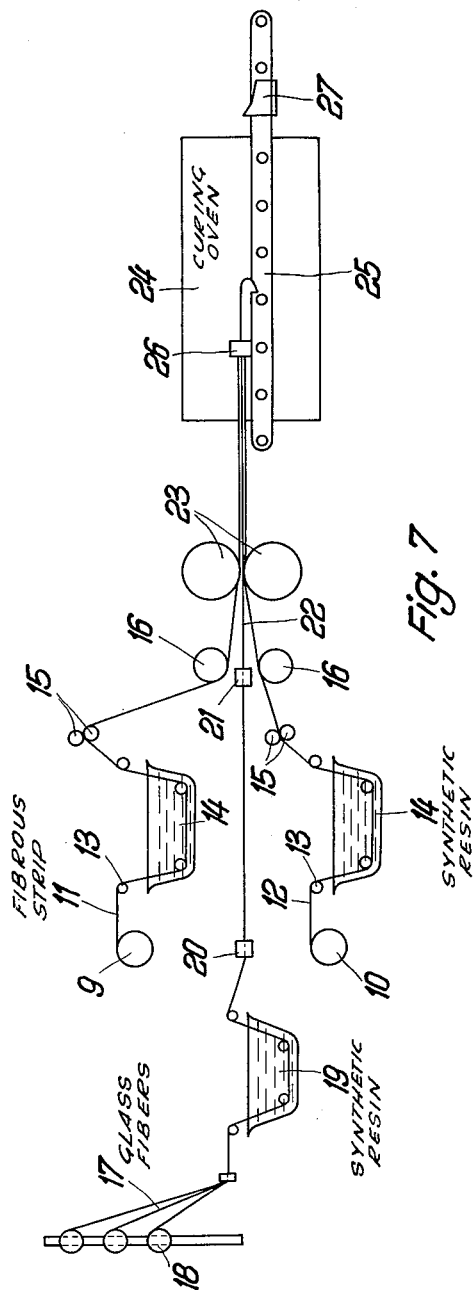

Feb. 8, 1966     W. GERHARDT     3,233,870
ROADSIDE GUARD STRUCTURE
Filed May 17, 1961     3 Sheets-Sheet 3
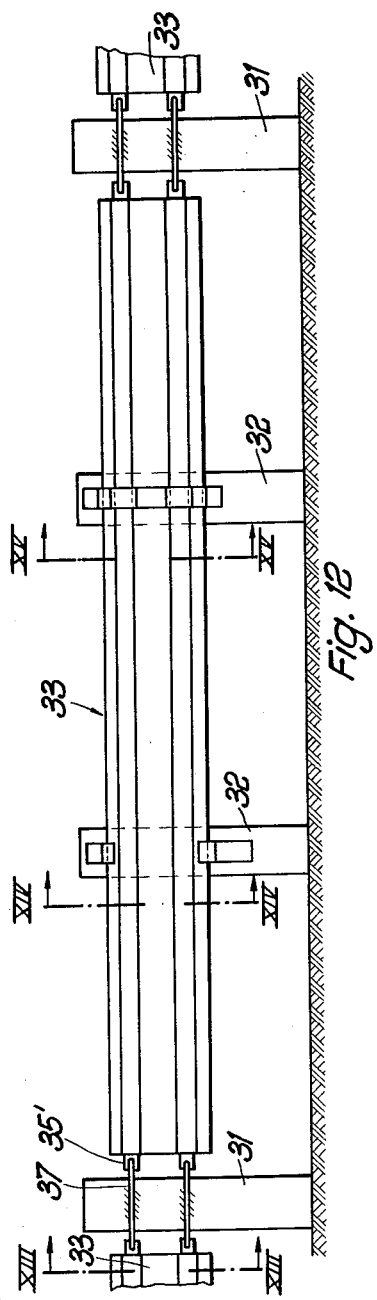
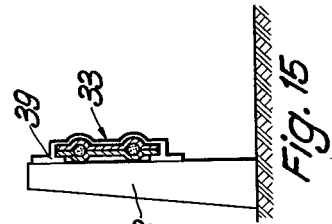
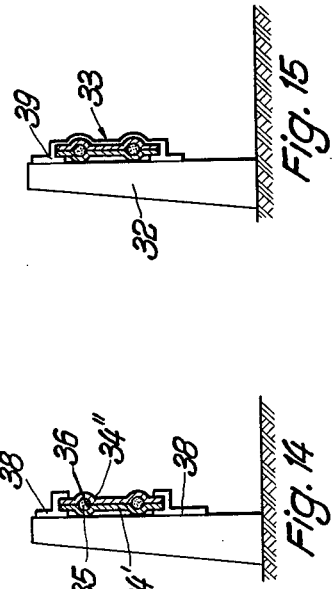
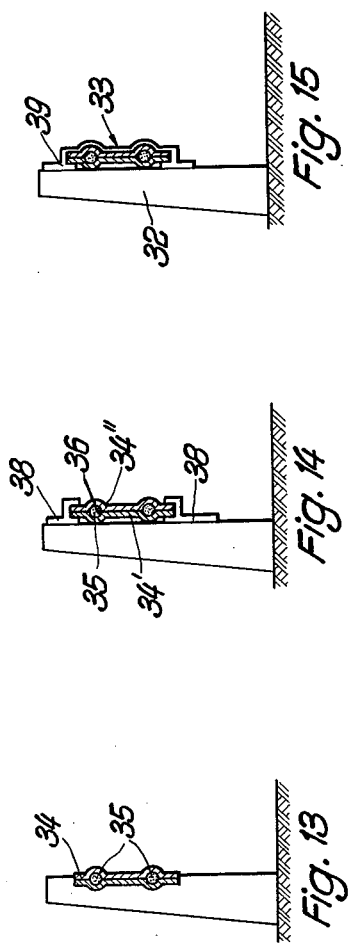
Inventor:
Woldemar Gerhardt
by Mestern, Ross & Mestern

3,233,870
ROADSIDE GUARD STRUCTURE
Woldemar Gerhardt, Bedastrasse 27, Dortmund-
Aplerbeck, Germany
Filed May 17, 1961, Ser. No. 110,775
Claims priority, application Germany, May 28, 1960,
G 29,777; Oct. 1, 1960, G 30,619
2 Claims. (Cl. 256—13.1)

Reinforced synthetic or artificial substances, especially those reinforced with glass fibers, have been introduced with great success into various technical fields, especially where the strength of non-reinforced synthetic materials is insufficient. Synthetic materials reinforced with glass fibers possesses a very high tensile strength in the direction of the glass fibers. On the other hand, their strength at right angles to the direction of the fibers falls off very sharply. If glass fibers superimposed in different directions or woven into fabrics are used for reinforcing synthetic materials, the strength is less than with oriented fibers. It is known in the manufacture of objects from synthetic materials reinforced with glass fibers to provide the locations which are subject to high stresses with additional insertions of glass fibers. However, it has been found that the varying content of glass in the synthetic material which results from such measures frequently leads to tension cracks and consequently to the objects becoming prematurely useless.

The object of the present invention is to provide multi-layer plates, boards and profiled bodies made from synthetic material reinforced by glass fibers or other reinforcing substances which do not possess the above-mentioned disadvantages but on the contrary have high strength and are not liable to tension cracks. This result is obtained in accordance with the invention in that the multi-layer body has one or more strands of synthetic material reinforced with fibers, the strands being embedded in and adhered to an outer covering of reinforced synthetic material; the fibers in the estrands, which are substantially parallel to one another, are oriented differently from those of the outer covering and preferably run transversely thereto. The strands of synthetic material reinforced by fibers and embedded in the outer covering run in the direction of the highest tensile stresses, that is to say they take up the tensile forces, whereas the outer covering primarily takes up the forces acting transversely thereto and protects the embedded strands from transverse stresses. For this purpose, therefore, the glass reinforcement in the outer covering is oriented in such a manner that the direction of the fibers is at right angles or at some other angle to the longitudinal direction of the embedded strands of synthetic material, which results may be obtained by using suitable strips or bands of fibrous material.

The outer covering which encloses the strands reinforced by fibers may advantageously consist of two or more layers of reinforced strips or bands of synthetic material suitably profiled in the region of the embedded strands of synthetic material but otherwise lie flat upon one another. The outer covering can, however, also consist of a suitably deformed tube of reinforced synthetic material in whose interior strands of synthetic material reinforced with glass fibers are embedded. Any intermediate spaces between the strands of synthetic material and the deformed tube are preferably filled with, for example, a foam of synthetic material. Finally, the covering layer which encloses the strand, or strands, of synthetic material which are strengthened with glass fibers may consist of one or more strips of reinforced synthetic material which are wound around the strands of synthetic material. Objects or articles strengthened with glass fibers in this manner can easily be manufactured. They are suitable, in particular, for the manufacture of profiled rods.

In the manufacture of profiled articles consisting of reinforced synthetic materials it is known to draw glass-fiber strands impregnated with resin through nozzles and thereafter through a suitably profiled mold or former. This mold or former is made so long that the profiled article polymerizes in its passage through it. A procedure of this nature is, however, only suitable for the manufacture of thin profiles because, if the profiled articles are thicker, large compression forces occur which destroy the outer strands of glass fibers passing through the nozzle. It is also difficult, when the dimensions of the profiled article are large, to carry the polymerization to completion within the mold or former, because the time of dwell available, which depends on the length of the mold or former and the speed with which the strands of glass fibers pass through it, is usually too short. In many cases, however, it is desirable that polymerization should take place slowly, because in general it improves the quality of the objects of synthetic material reinforced with glass fibers.

According to the present invention, the above-mentioned difficulties in the manufacture of thick profiled articles of synthetic material strengthened by glass fibers are overcome in that the strands of glass fibers impregnated with synthetic resin and embedded in the outer covering, instead of being polymerized in a separate mold which produces the finished profile, are directly polymerized in recess or channels formed in the outer covering consisting of strips or bands of fibrous material impregnated with synthetic resin. This can be done in the manufacture of multi-layer objects of synthetic materials strengthened by glass fibers by rolling longitudinal grooves in two continuously supplied strips of synthetic material impregnated with synthetic resin which form the upper and lower outer layers, then rolling together the two strips with bundles of fibers impregnated with synthetic resin lying in the grooves and finally drawing the two strips with the impregnated fiber bundles in them through a hardening furnace in which they are brought to the polymerization temperature. It is advisable in this case that the composition of the resin for impregnating the bands or strips forming the outer layers or covering and that for impregnating the fiber bundles should be such that the polymerization of the resin in the outer covering begins at a lower temperature and proceeds more quickly than that impregnating the fiber bundles, so that the resin in the fiber bundles can polymerize between the outer layers which have already solidified sufficiently. The outer layers, therefore, form the mold in which the polymerization of the strands composed of fiber bundles impregnated with synthetic resin can proceed. In this way it is possible to enable the polymerization to take place more slowly.

Another possibility for the manufacture of the bodies of synthetic material reinforced with glass fibers is to deform a tube made from fiber-reinforced synthetic material into a "T," "I," "L" or similar profile, and to draw one or more bundles of fibers impregnated with synthetic resin through the interior of the profiled tube and to polymerize the resin in the tube which acts as a mold. In this case, as also in the previously mentioned case, it is possible to pre-stress the fibers before polymerization whereby the strengthening of the objects or articles manufactured in this manner is further increased.

It has also been found that the new profiled articles of fiber-reinforced synthetic material, which consist of reinforced strands of synthetic material embedded in and adhered to an outer covering of reinforced synthetic material and run in the longitudinal direction can be used with great advantage for roadside guard rails. Such rails, used for safety purposes, act directly as a lateral protection and indirectly as a lateral guide for the road user. They are used not only in streets but also for bridges, quays, docks and the like. Their main use, however, is for motor roads where they are used as edgings for the side, center roadways and for dividing the track, for making the course of the road better visible and especially for marking curves. For such purposes, steel strips have hitherto been used exclusively, the strips being fixed to steel posts or similar supports. For increasing their strength, the steel strips were canted or corrugated. The length of the strips customarily used was usually about 4 meters. As compared with them, the guard rails which are used in accordance with the invention, consisting of profiled strips of synthetic materials reinforced with fibers, have an unusually high tensile strength in the direction of the strands of fiber-reinforced synthetic material and also possess a sufficient elastic resiliency in the longitudinal direction of the profile which makes them particularly suitable for use as road guards.

Such guard rails made of profiled synthetic material reinforced with fibers are advantageously so arranged, according to a further feature of the invention, that they are suspended or clamped by the ends of the longitudinally extending strands to fixed supports between which they are connected to further supports on which they are longitudinally displaceable. The reinforced profiled strips of synthetic material are therefore rigidly fixed to supports only at their ends, whereas they are freely guided on the supports between their ends by means of eyes, retaining loops or the like so that, owing to the increase in the bending or expansion which is then possible, the rails are better able to yield and withstand or resiliently absorb the impact of a vehicle. Preferably, the rails, as compared with the short steel strips which are only about 4 meters in length, are made in greater lengths, for example, of 20 meters or more, in order to allow sufficient yielding to take place.

Finally, the rails can be provided with luminous materials or strips embedded in or applied to their outer surface or with reflecting strips or the like placed on it, so that they can be more easily recognized in darkness and can be seen sooner.

The invention is illustrated, by way of example, in the accompanying drawing in which:

FIGURES 1–6 show examples of multi-layer bodies of synthetic material, reinforced with glass fibers, in perspective or sectional views;

FIGURE 7 is a diagrammatic view of an apparatus for the manufacture of the article illustrated in FIGS. 1 and 2;

FIGURES 8–11 illustrate details of the apparatus shown in FIG. 7;

FIGURE 12 is a diagrammatic view of a roadside guard rail embodying the invention; and FIGURES 13, 14 and 15 are sections on the lines XIII—XIII, XIV—XIV and XV—XV, respectively, of FIG. 12.

As shown in FIGS. 1 and 2, the plate-like body which is illustrated partly in section consists of an outer covering 1 of reinforced synthetic material and a strand 2 of synthetic material reinforced with fibers which is embedded in and bonded to the covering 1. The strand 2, whose embedded fibers are substantially parallel to one another, preferably contains glass fibers 3 which are oriented differently as compared with the fibers 4 of the outer covering 1, in that they run transversely thereto. The outer covering 1 in this embodiment consists of two layers 1', 1" of reinforced strips of synthetic material which are of semi-circular profile 5 in the region of the embedded strand 2 of synthetic material but otherwise lie flat against one another. The glass fibers 3 of the strand 2 run in the direction in which the main tensile stress acts on the plate, that is to say they take up the greater part of the tensile forces. The stresses acting transversely thereto are taken by the glass fibers 4 in the outer covering 1. They, therefore, protect the fiber-reinforced strand 2 from undesired transverse stresses. Consequently, the plate illustrated in FIGS. 1 and 2 has a substantially equal strength in all directions.

The bodies illustrated in FIGS. 3 and 4 also consist of an outer covering 6 or 6' of fiber-reinforced synthetic material and of strands 2 of synthetic material reinforced with glass fibers and embedded therein. As distinguished from the body illustrated in FIG. 1, the outer covering 6 or 6' is in the form of a coil. In the article shown in FIG. 3 a strip, consisting of reinforced synthetic material, is wound directly around the strand 2 of synthetic material to form the roll 6. A body of this kind can be used for making profiled bars, because it is easy to manufacture and its strength both in the longitudinal direction of the strand 2 of synthetic material and at right angles thereto is very considerable.

In the embodiment illustrated in FIG. 4, the strip 6' which forms the outer covering is wound around two strands 2 of fiber-reinforced synthetic material which are spaced apart from each other. The space 7 between the two strands 2 can be reduced by pressing together the covering 6' or it can be filled with synthetic material.

In the embodiment illustrated in FIG. 5, the outer covering 8 which encloses the strands 2 of artificial material strengthened by fibers consists of a reinforced tube of synthetic material which is deformed so as to have a dumbbell-shaped cross-section. In FIG. 6 the outer covering 8' is also formed from a tube of synthetic material which, in this case, however, is deformed to a T-shape. A strand 2 of synthetic material reinforced with glass fibers is also embedded in or adhered to the outer T-shaped covering, whereas any remaining intermediate space 7' can again be filled with synthetic material.

An apparatus for making the profiled sheets shown in FIGS. 1 and 2 is illustrated diagrammatically in FIG. 7. The fibrous strips 11 and 12, which form the upper and lower outer layers 1' and 1", respectively, of the finished plate-like body, are taken from supply reels 9 and 10 and are continuously conveyed by guide rolls 13 through vessels 14 filled with suitable solutions of synthetic resin. The strips pass through pairs of squeezing rollers 15 and then pass the forming rollers 16 which coact with a supporting table 47 as shown in FIG. 8. The forming rollers 16 roll longitudinal grooves in the strips 11 and 12. The profile of the grooves corresponds to the recesses 48 in the supporting table 17. The strands of synthetic material reinforced with glass fibers which are placed in the grooves of the reinforced strips 11 and 12 are produced by withdrawing a roving 17 of glass fibers from the warp beam 18, the roving 17 being passed through a trough 19 in which it is charged with artificial resin and then drawn through nozzles 20 and 21. The strands 22 of synthetic material which enter the grooves in the strips 11 and 12 are rolled together to form the finished profile between the profiled rollers 23 which are disposed beyond the roller 16 and the nozzle 21. The shape of the profile rollers 23 is shown in FIG. 9. The plate or board which leaves the profile rollers 23, and is illustrated in section in FIG. 10, then arrives in a hardening furnace or curing oven 24 in which it is brought to the necessary polymerization temperature. The tension necessary for conveying the sheet is exerted by a moving chain 25 and a clamp 26 which is shown in FIG. 11. In order that the process of manufacture may be continuous, a number of such clamps are preferably provided on the chain 25 and arranged at suitable distances apart so as to engage the profiled sheet or board in succession and then to release it again. A cutter 27 is provided beyond the hardening furnace 24 and cuts the emerging profiled board which emerges from the furnace into the desired lengths.

Before the strips 11 and 12 are rolled together with the fiber-reinforced strands 22, fabric strips or other inserts for transverse stiffening can be placed between the strips 11, 12. These inserts can again be removed after the strips 11 and 12 have been rolled together for the purpose of forming transverse channels. This enables further strands of synthetic material strengthened by glass fibers to be drawn through these transverse channels.

In many cases it is desirable to pre-stress the strands 22 before they enter the pair of profiled rollers 23. This can be effected, for example, by braking rollers or the like arranged before the rollers 23. In this way the tensile strength of the profiled sheet or board is further increased. Twisting of the glass-fiber-reinforced strand is also advantageous in this respect. It may also be mentioned that instead of glass fibers other reinforcements can be used for the multi-layer body of the invention. Such reinforcements may consist, for example, of perlon, sisal or textile fibers. It has been found, however, that the best results are obtained with glass fibers.

FIGURE 12 illustrates an important use for the articles made in accordance with the invention. It shows a roadside guard structure which consists essentially of supports 31 erected beside the edge of a road, bridge or the like at some distance from one another, further supports 32 arranged between the supports 31, and the actual guard rails or planks 33 which run at right angles to the supports 32 and are carried by them. The rails or planks consist of profiled sheets of synthetic material reinforced by fibers, of the form shown in FIG. 10. Within each board one or more strands 35 of fiber-reinforced synthetic material are embedded in and adhered to an outer covering 34 of reinforced synthetic material. The fibers in the strands 35 which run in the longitudinal direction of the profile are oriented differently from those in the outer covering 34 and preferably run transversely thereto. In the embodiment illustrated, the profiled rails are made in three layers and consist of two outer layers 34' and 34" of reinforced synthetic material, into which the grooves 36 running in the longitudinal direction of the profile are rolled. These grooves are used for taking the strands 35 of synthetic material strengthened by fibers, preferably glass fibers. These reinforced profiled rails are preferably manufactured as follows. The longitudinal grooves 36 are first rolled into two strips of fibrous material impregnated with synthetic resin which are continuously supplied and form the upper and lower outer layers 34', 34", after which the two strips 34', 34" are rolled together with the strands 35 of fiber bundles impregnated with synthetic resin between the grooves 36. Finally, the two strips 34', 34" together with the strands 35 of fiber-reinforced plastic material in them are drawn through a hardening furnace in which they are brought to the polymerization temperature, as described in connection with FIG. 7. It will be understood that the boards of reinforced synthetic material can also be manufactured in a different manner and may be of a different nature provided care is taken that they contain one or more strands of synthetic material reinforced with fibers running in the longitudinal direction of the board.

The guard rails 33 can also be fixed in the manner shown in FIG. 12 to supports 31 arranged at a considerable distance apart from one another. They are preferably fixed by the projecting ends 35' of the reinforced strands 35 of synthetic material which run in the longitudinal direction and are provided for this purpose with suitable fastening eyes, loops or the like which engage retaining means 37 that are fixed to the supports 31 and consist, for example, of strainers, turnbuckles or the like. In this way, the rails are rigidly fixed to the supports 31. On the other hand the rails 33 are carried by the intermediate supports 32 disposed between the end supports 31 so as to be displaceable in the longitudinal direction. For this purpose, retaining angles 38 provided on the supports 32 extend over the rails 33 from above and below and also from the front, so that they are supported and are displaceable only in the longitudinal direction. Another form of construction is shown in FIG. 15, is in which a retaining member 39, which passes right across the front of the rail 33, is fixed to the support 32. This ensures that the long rails 33 have relatively long expansion paths and can yield resiliently over their entire length which may amount to 20 meters or more. Thus, if a force acts on any part of the rail 33 owing to a vehicle being driven onto it, this force is taken up not only by the part of the rail lying between two adjacent supports, but by the entire length of the board, because the rail 33 is freely guided in the intermediate supports 32 and can yield there, so that the entire board of reinforced synthetic material can be utilized for taking up the force. Synthetic materials reinforced with glass fibers have a very high capacity for absorbing energy. Profiled boards of this nature are, therefore, particularly suitable for arresting stresses to which road-skirting boards are exposed. Owing to the strands of synthetic material reinforced with glass fibers which are inserted in the longitudinal direction of the profile, a sufficiently great tensile strength is also ensured. It will be understood, however, that profiled rails of synthetic material reinforced with fibers, especially when they are freely guided on the intermediate supports, possess great advantages, owing to their high elasticity and energy absorption, as compared with the customary rails made of steel strip which consists of relatively rigid, short lengths.

The guard rails embodying the invention are of low weight and their assembly is greatly facilitated. After being manufactured, the rails can be wound on drums of large diameter similar to cable drums. They can be easily transported and unwound at the site at which they are to be used, and can be cut by hand to the necessary lengths. Further, the rails, owing to their elasticity, can easily be bent so that extensive bending work which is necessary for strips made of steel is superfluous. Finally, it may also be mentioned that the profiled rails of reinforced synthetic material are resistant to corrosion, whereas steel strips require continuous supervision owing to the danger of rusting. The rails can also be colored in any desired manner in order to obtain special color effects and they can be provided with luminous substances as is especially desirable for marking the roadways.

I claim:

1. A roadside guard structure comprising a pair of upstanding horizontally spaced supports, a rail of plastic material extending horizontally between said supports and lying in a substantially vertical plane, said rail being internally formed with a plurality of thoroughgoing horizontal channels vertically separated from one another and with imbedded vertical reinforcing fibers on both sides of said channels, a plurality of resinous strands with imbedded horizontally extending reinforcing fibers respectively occupying said channels in bonded relationship with said rail, said strands having ends projecting beyond said rail, and fastening means on said supports engaging said projecting ends and maintaining said rail stretched therebetween.

2. A guard structure as defined in claim 1, further comprising at least one auxiliary post between said support and retaining means on said post engaging said rail with freedom of relative horizontal displacement.

References Cited by the Examiner
UNITED STATES PATENTS

| | | | |
|---|---|---|---|
| 1,152,372 | 8/1915 | Miller | 264—255 |
| 1,698,150 | 1/1929 | Baird | 94—1.5 |
| 1,740,501 | 12/1929 | Eckstrand | 94—1.5 |
| 2,322,771 | 6/1943 | Palm et al. | 154—52 |
| 2,565,219 | 8/1951 | Gardiner et al. | 161—143 X |
| 2,749,643 | 6/1956 | Scott. | |
| 2,767,113 | 10/1956 | Bower | 154—53.6 XR |
| 2,777,790 | 1/1957 | Kish | 264—250 |
| 2,977,637 | 4/1961 | Thompson | 264—250 |
| 2,979,632 | 4/1961 | MacNeille | 156—67 XR |
| 3,002,534 | 10/1961 | Noland | 156—161 XR |
| 3,053,717 | 9/1962 | Bright | 161—143 |
| 3,126,429 | 3/1964 | Saffir | 264—255 |

JACOB H. STEINBERG, *Primary Examiner.*

ALEXANDER WYMAN, HAROLD ANSHER,
*Examiners.*